United States Patent
Petronio

(10) Patent No.: US 8,887,483 B2
(45) Date of Patent: Nov. 18, 2014

(54) ROCKET ENGINE AND METHOD FOR CONTROLLING COMBUSTION IN THE ROCKET ENGINE ITSELF

(75) Inventor: Dino Petronio, Trieste (IT)

(73) Assignee: Selex Galileo S.p.A., Campi Bisenzio (IT)

( * ) Notice: Subject to any disclaimer, the term of this patent is extended or adjusted under 35 U.S.C. 154(b) by 866 days.

(21) Appl. No.: 12/975,945

(22) Filed: Dec. 22, 2010

(65) Prior Publication Data

US 2012/0067023 A1 Mar. 22, 2012

(30) Foreign Application Priority Data

Dec. 23, 2009 (IT) .............................. TV2009A0238

(51) Int. Cl.
*F02K 9/58* (2006.01)
*F02K 9/56* (2006.01)
(52) U.S. Cl.
CPC .... *F02K 9/58* (2013.01); *F02K 9/56* (2013.01)
USPC .................... 60/204; 60/257; 60/259; 60/251
(58) Field of Classification Search
USPC .................... 60/251, 257–260, 204, 219, 220
See application file for complete search history.

(56) References Cited

U.S. PATENT DOCUMENTS

| 2,955,413 | A | * | 10/1960 | Glasson | ........................ | 60/259 |
|---|---|---|---|---|---|---|
| 2,995,008 | A | | 8/1961 | Fox | | |
| 3,044,254 | A | | 7/1962 | Adelman | | |
| 3,094,837 | A | | 6/1963 | Sherman et al. | | |
| 3,116,599 | A | * | 1/1964 | Campbell | ...................... | 60/251 |
| 3,151,448 | A | | 10/1964 | White | | |
| 4,019,319 | A | * | 4/1977 | Oda et al. | ........................ | 60/258 |
| 5,579,636 | A | * | 12/1996 | Rosenfield | ..................... | 60/251 |
| 6,367,244 | B1 | * | 4/2002 | Smith et al. | ..................... | 60/251 |
| 7,257,940 | B1 | | 8/2007 | Knight | | |

FOREIGN PATENT DOCUMENTS

FR 1487148 A 6/1967

OTHER PUBLICATIONS

Sutton et al "Rocket Propulsion Elements," Seventh Edition, 2001, pp. 579-580.*
Italian Search Report for IT TV20090238 dated Jul. 22, 2010.

* cited by examiner

*Primary Examiner* — Ted Kim
(74) *Attorney, Agent, or Firm* — Jenkins, Wilson, Taylor & Hunt, P.A.

(57) ABSTRACT

Supply of a liquid component in a combustion chamber of a rocket engine is controlled by a feed valve provided with slide valve mobile between an open position and a closed position of at least one supply pipe, which has an inlet that communicates with a tank for containing the liquid component and an outlet that communicates with the combustion chamber. The displacement of the slide valve from its closed position to its open position is triggered by a pressurized fluid supplied to the outlet of the supply pipe.

19 Claims, 4 Drawing Sheets

ROCKET ENGINE AND METHOD FOR CONTROLLING COMBUSTION IN THE ROCKET ENGINE ITSELF

CROSS-REFERENCE TO RELATED APPLICATIONS

This application claims priority to Italian Patent Application No. TV2009A 000238 filed Dec. 23, 2009, the entire disclosure of which is herein incorporated by reference.

The present invention relates to a rocket engine.

The present invention finds particularly advantageous application in a hybrid-propulsion rocket engine used, preferably though not necessarily, in launching a remote-control aircraft, to which the ensuing treatment will make explicit reference without, however, this implying any loss of generality.

BACKGROUND OF THE INVENTION

In the sector of hybrid-propulsion rocket engines, it is known to provide a rocket engine of the type comprising: a combustion chamber for combustion of a fuel, in the case in point a fuel in the solid state, with a comburent, in the case in point an oxidant in the liquid state; a nozzle for discharge of the products of combustion from the combustion chamber; a tank for containing the liquid oxidant; and a feed valve to control the supply of the liquid oxidant from the container tank to the combustion chamber.

Generally, the feed valve comprises a valve body, at least one supply pipe made in the valve body for communicating with the container tank and with the combustion chamber, an obturator mounted in the supply pipe, and an actuator device to move the obturator between a position of opening and a position of closing of the supply pipe itself.

Since the obturator must be displaced between its open and closed positions in a relatively short time interval and, hence, at a relatively high actuation rate, the actuator device must be shaped for generating a relatively high actuation power and is, hence, relatively cumbersome, heavy, and costly.

From what has been set forth above, it follows that, on account of the presence of the device for actuating the obturator, known rocket engines of the type described above are relatively complex, cumbersome, heavy, and costly.

SUMMARY OF THE INVENTION

The aim of the present invention is to provide a rocket engine that will be free from the drawbacks described above and that will be simple and inexpensive to produce.

According to the present invention a rocket engine is provided as claimed in the attached Claims.

The present invention moreover regards a method for controlling combustion of a rocket engine.

According to the present invention, a method for controlling combustion of a rocket engine is provided as claimed in the attached Claims.

BRIEF DESCRIPTION OF THE DRAWINGS

The present invention will now be described with reference to the annexed drawings, which illustrate a non-limiting example of embodiment thereof and in which.

DETAILED DESCRIPTION OF THE INVENTION

Figure 2:
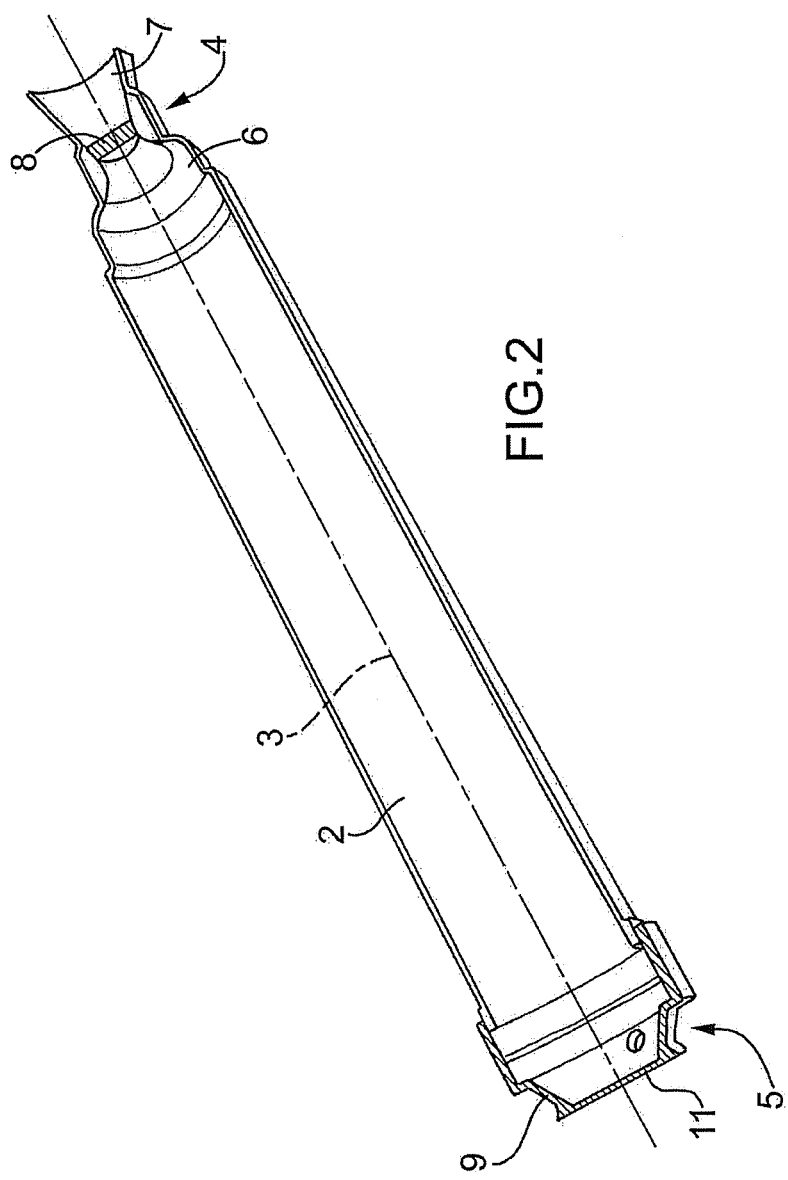
FIG. 2 is a schematic longitudinal section, with parts removed for reasons of clarity, of a first detail of the rocket engine of FIG. 1.
Figure 1:
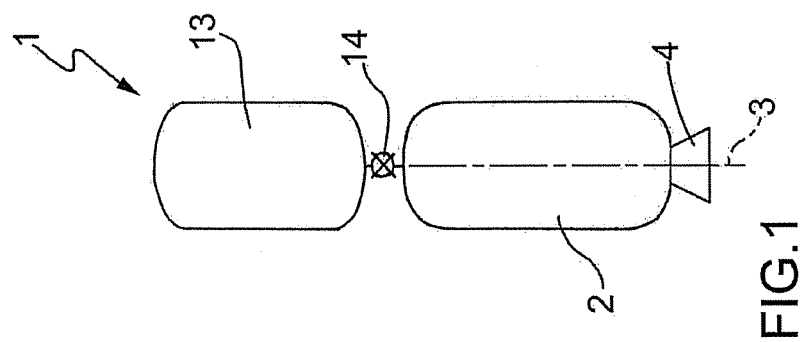
FIG. 1 is a schematic view of a preferred embodiment of the rocket engine of the present invention.

With reference to FIGS. 1 and 2, designated as a whole by 1 is a hybrid-propulsion rocket engine comprising a combustion chamber 2 of a substantially cylindrical shape, which has a longitudinal axis 3, houses inside it a fuel in the solid state (known and not illustrated), is axially limited, at one free end thereof, by a exhaust nozzle 4 able to discharge of the products of combustion into the atmosphere, and is axially limited, at its free end opposite to the exhaust nozzle 4, by an injection head 5.

The nozzle 4 has a convergent inlet portion 6 and a divergent outlet portion 7, and is closed, in an initial starting configuration thereof, by a closing disk 8, which has a substantially circular shape, is mounted in an intermediate point of the nozzle 4 in a direction orthogonal to the axis 3, and is shaped so as to break when the pressure in the chamber 2 is at least equal to a given threshold value as will be will be described in what follows. Breakage of the disk 8 enables the combustion products to exit from the chamber 2 and the rocket engine 1 to generate the thrust required.

The head 5 is limited by a side wall 9 substantially shaped like a truncated cone, is provided with a plurality of pyrogenic primers 10 mounted through the wall 9 so as to project within the chamber 2, and is axially limited by an injection plate 11, which is substantially orthogonal to the axis 3, and has a plurality of holes 12 made through the plate 11 parallel to the axis 3 itself.

According to what is illustrated in FIGS. 1, 3a, 3b and 3c, the chamber 2 is connected to a tank 13 for containing a pressurized oxidant in the liquid state via the interposition of a feed valve 14 comprising a tubular valve body 15, which is substantially bell-shaped and is limited by a side wall 16, which is fixed to the head 5 so that it shares the axis 3, and is shaped so as to define a substantially frusto-conical intake chamber 17 facing the plate 11 and a sliding cylinder 18 set on the opposite side of the plate 11 with respect to the chamber 17 itself.

The cylinder 18 has a restricted portion 19 and a widened portion 20, arranged in succession with respect to one another starting from the chamber 17, and communicates with the tank 13 via a plurality of supply pipes 21, which are made through the valve body 15, are distributed about the axis 3, face the portion 19, and are connected with the tank 13 itself.

The cylinder 18 is slidably engaged by a slide valve 22, which is substantially bell-shaped with concavity opposite to that of the valve body 15, is provided with a plurality of annular gaskets 23 mounted on the outer surface of the slide valve 22 sharing the axis 3, and has an annular end flange 24 projecting radially outwards from the outer surface of the slide valve 22 itself.

The slide valve 22 is displaced, and normally held, in a closed position (FIG. 3a), in which the pipes 21 are closed and hydraulically separated in a fluid-tight way from the chamber 17 via the gaskets 23, by a spring 25 mounted between the valve body 15 and the slide valve 22 so that it is coaxial the axis 3 in order to exert on a first side of the slide valve 22 an axial thrust oriented parallel to the axis 3 and in the direction of the chamber 17.

The slide valve 22 is stopped in its closed position by engagement of the flange 24 with an annular end stop shoulder 26 defined between the portions 19 and 20.

In use, ignition of the pyrogenic primer 10 generates within the combustion chamber 2 a pressurized hot flow of gas, which enters the intake chamber 17 through the holes 12 of the injection plate 11, has a pressure lower than the pressure of failure of the closing disk 8, and thus determines an increase in the pressure within the chambers 2 and 17, and generates on a second side of the slide valve 22 opposite to the aforesaid first side an axial thrust opposite to the thrust of the spring 25.

Figure 3A:
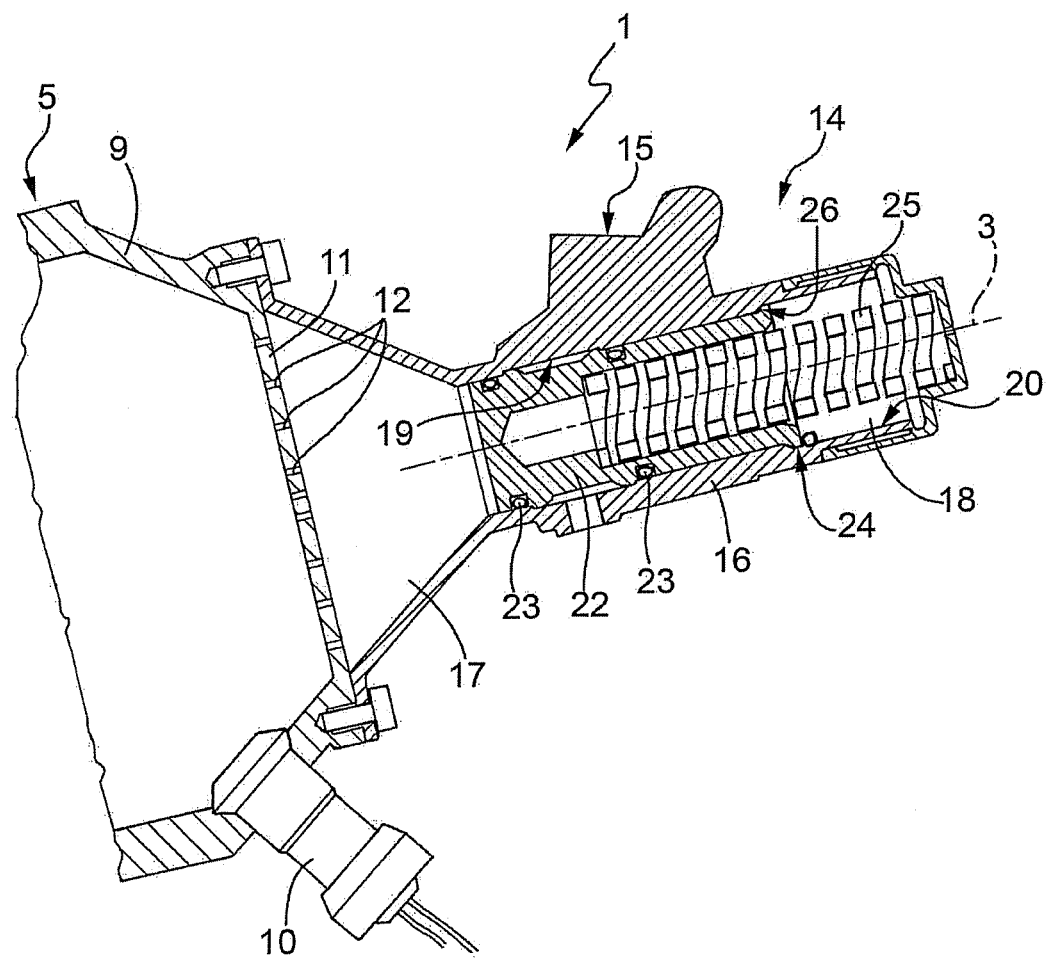
FIGS. 3a, 3b, and 3c are three schematic longitudinal sections, with parts removed for reasons of clarity, of a second detail of the rocket engine of FIG. 1 illustrated in three different operating positions.
Figure 3B:
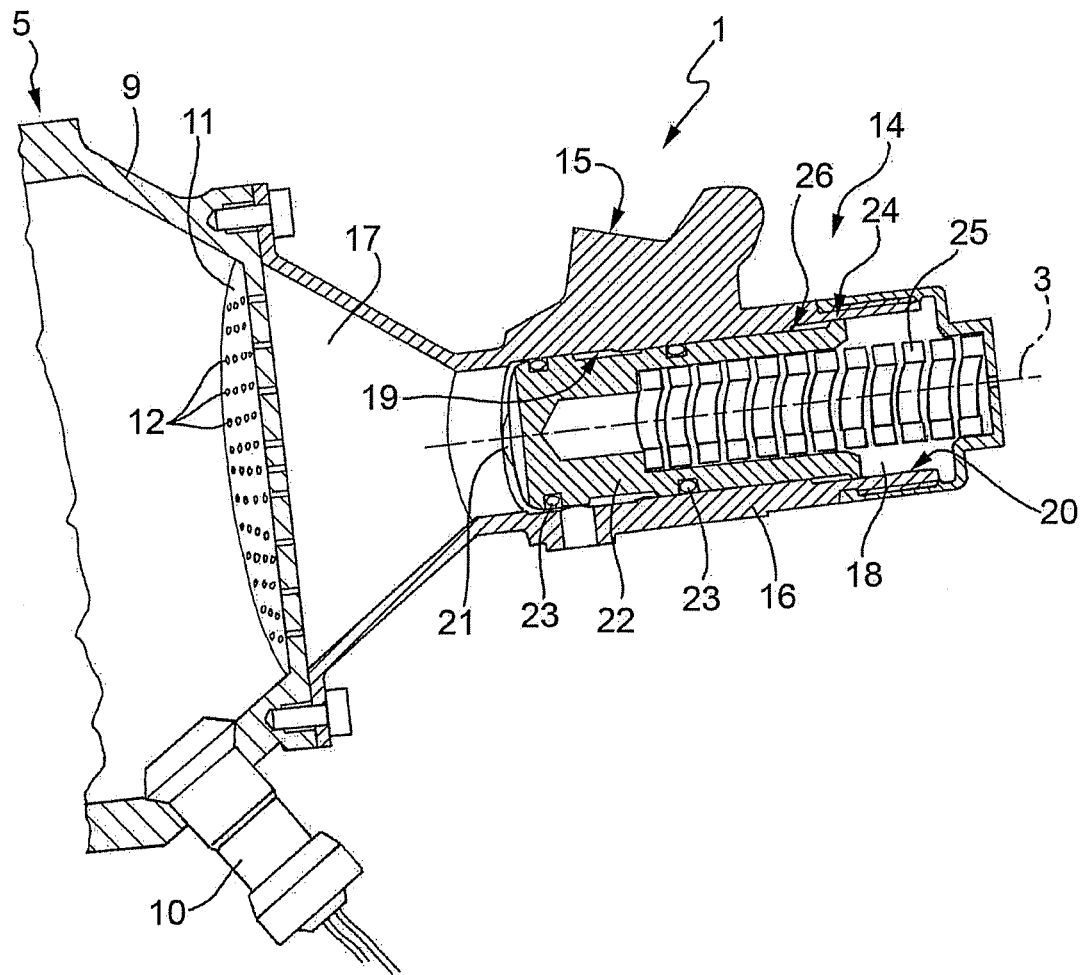

When the thrust exerted on the slide valve 22 by the pressurized gas present in the chamber 17 exceeds the thrust exerted on the slide valve 22 itself by the spring 25, the slide valve 22 is moved against the action of the spring 25 from its closed position into a position of partial opening of the supply pipes 21 (FIG. 3b).

Figure 3C:
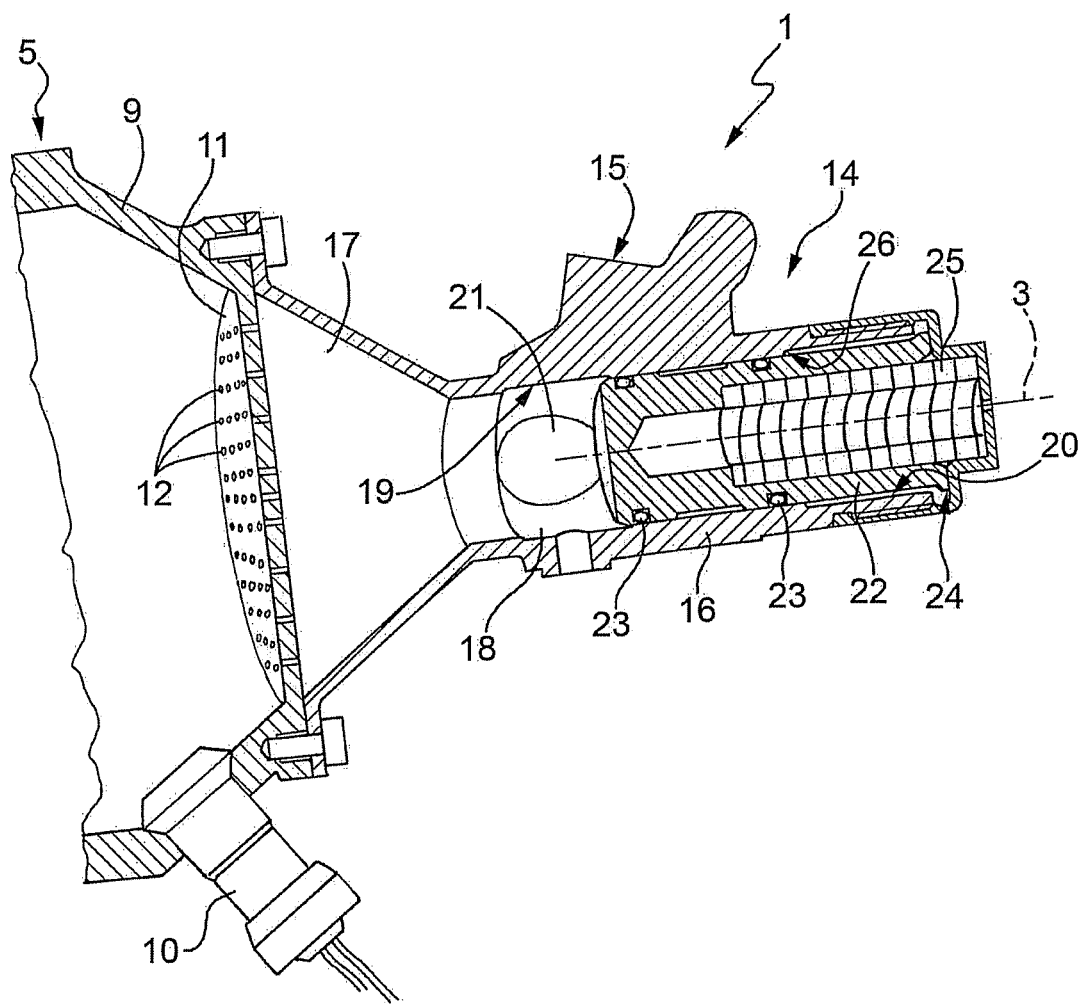

Since the pressure of the liquid oxidant contained in the tank 13 is higher than the pressure of the flow of gas generated by ignition of the pyrogenic primers 10, the partial opening of the pipes 21 enables supply of the liquid oxidant from the tank 13 into the chamber 17 and, hence, movement of the slide valve 22 from its position of partial opening into a position of total opening of the pipes 21 themselves (FIG. 3c).

In connection with what has been set forth above, it should be pointed out that the pressure of the liquid oxidant contained in the tank 13 is approximately ten times higher than the pressure of the flow of gas generated by ignition of the pyrogenic primers 10 and that the slide valve 22 is hence moved from its closing position into its position of partial opening in a time interval longer than the time interval in which the slide valve 22 is moved from its position of partial opening into its position of total opening.

Following upon complete opening of the pipes 21, the liquid oxidant is first supplied into the chamber 17 through the total section of passage of the pipes 21, is then supplied into the combustion chamber 2 through the holes 12 of the injection plate 11, and finally reacts chemically with the solid fuel contained in the chamber 2 itself.

The products of combustion generated by the chemical reaction between the solid fuel and the liquid oxidant have a pressure higher than the pressure of failure of the disk 8. They thus determine failure of the disk 8, and are discharged outside the chamber 2 through the nozzle 4 so as to generate the thrust required of the rocket engine 1.

Following upon progressive emptying of the tank 13 and consequent reduction of the pressure in the chamber 17 to a value equal to a first given threshold value, the thrust exerted on the slide valve 22 by the liquid oxidant present in the chamber 17 is lower than the thrust exerted on the slide valve 22 by the spring 25, and the slide valve 22 is axially displaced starting from its position of total opening so as to close the pipes 21 progressively.

When the total section of passage of the liquid oxidant from the pipes 21 into the cylinder 18 is substantially equal to the total section of passage of the holes 12 of the plate 11 and the pressure in the chamber 17 is substantially equal to a second threshold value lower than the aforesaid first threshold value, the amount of oxidant liquid supplied into the chamber 17 through the pipes 21 is unable to oppose the thrust exerted on the slide valve 22 by the spring 25.

For values of pressure in the chamber 17 lower than the aforesaid second threshold value, the behaviour of the slide valve 22 is degenerative and each reduction in pressure in the chamber 17 entails each time a further reduction in the total section of passage of the liquid oxidant from the pipes 21 into the cylinder 18 and, hence, a further reduction of the pressure in the chamber 17 until the valve 14 closes completely.

In connection with what has been set forth above, it should be pointed out that the pressure in the chamber 17 decreases from the first threshold value to the second threshold value in a time interval longer than the time interval in which the slide valve 22 completes closing of the valve 14 starting from the second threshold value.

Since the valve 14 is actuated by combining the action of the pyrogenic primers 10 with the action of the liquid oxidant supplied by the tank 13 into the chamber 17 and the slide valve 22 is displaced between its opened and closed positions without resorting to a driving motor, the rocket engine 1 is relatively simple, inexpensive, and light.

In addition, the conformation and modes of opening of the valve 14 enable rapid supply of a large amount of liquid oxidant from the tank 13 into the combustion chamber 2, rapid increase in the pressure in the chamber 2, and rapid generation of a high thrust through the exhaust nozzle 4.

Obviously, according to variants not illustrated, the feed valve 14 can be used for controlling supply of a fuel in the liquid state into the combustion chamber of a hybrid-propulsion rocket engine with comburent in the solid state and for controlling supply of a fuel in the liquid state and of a comburent in the liquid state into the combustion chamber of a liquid-propulsion rocket engine.

The invention claimed is:

1. A rocket engine comprising:
a combustion chamber for combustion of two components, of which one is a fuel and the other is a comburent and of which at least one is in an initial liquid state;
an exhaust nozzle disposed at one end of the combustion chamber for discharging combustion products from the combustion chamber;
an injection head disposed at another or at an opposite end of the combustion chamber, the injection head comprising an injection plate having a plurality of holes to enable fluid communication between the injection head and a frustoconical intake chamber;
a feed valve interposed between a container tank and the combustion chamber to control a supply of the liquid component from the container tank to the combustion chamber, wherein the feed valve comprises:
a tubular valve body defining the frustoconical intake chamber disposed on one end of the feed valve,
a sliding cylinder defined by the tubular valve body and having a longitudinal axis, the sliding cylinder comprising a restricted portion, a widened portion and an annular end stop shoulder defined between the restricted portion and the widened portion,
at least one inlet for the liquid component to move into the sliding cylinder,
an outlet for the liquid component to move from the sliding cylinder into the combustion chamber,
a slide valve slidably engaged in the sliding cylinder, the slide valve comprising an annular end flange projecting radially outwards from an outer surface of the slide valve, and
a spring, at least a portion of which is disposed within a portion of the slide valve, the spring acting axially on a first side of the slide valve to move and retain the slide valve into a closed position to close the inlet, wherein the slide valve is stopped in the closed position by engagement of the flange with the end stop shoulder; and
a primer device mounted through a side wall of the combustion chamber and projecting within to supply a pressurized fluid acting axially on a second side of the slide valve, the second side being opposite to the first side, to move the slide valve against the action of the spring from the closed position into a first open position, where the inlet is partially open for enabling the liquid component to enter the sliding cylinder, to axially act on the second side against the action of the spring, and to move the slide valve from the first open position to a second open position, where the inlet is completely open;

wherein the spring is shaped so as to exert on the first side of the slide valve a thrust lower than a thrust exerted by the pressurized fluid on the second side of the slide valve.

2. The rocket engine according to claim 1, wherein the primer device comprises at least one pyrogenic primer to supply the pressurized fluid.

3. The rocket engine according to claim 1, wherein the spring is an elastic thrust spring.

4. The rocket engine according to claim 1, wherein the sliding cylinder is laterally limited by a first side wall extending about the longitudinal axis, the inlet being made through the first side wall.

5. The rocket engine according to claim 1, wherein the outlet is substantially coaxial of the longitudinal axis.

6. The rocket engine according to claim 1, further comprising a gasket inserted between the slide valve and the sliding cylinder to separate in a fluid-tight manner the inlet from the outlet when the slide valve is arranged in the closed position.

7. The rocket engine according to claim 1, wherein the injection head faces the sliding cylinder.

8. The rocket engine according to claim 7, wherein the injection plate faces the outlet.

9. The rocket engine according to claim 1, wherein the combustion of the fuel with the comburent generates within the combustion chamber a first pressure higher than a second pressure generated within the combustion chamber by the pressurized fluid, the combustion chamber further comprising a member for closing the exhaust nozzle, which is shaped so as to break when pressure in the combustion chamber is at least equal to the first pressure.

10. The rocket engine according to claim 1, wherein the combustion chamber is limited by a second side wall.

11. A method to control combustion in a rocket engine, the rocket engine comprising a combustion chamber for combustion of two components, of which one is a fuel and the other is a comburent and of which at least one is in an initial liquid state, an exhaust nozzle disposed at one end of the combustion chamber for discharging combustion products from the combustion chamber; an injection head disposed at another or at an opposite end of the combustion chamber, the injection head comprising an injection plate having a plurality of holes to enable fluid communication between the injection head and a frustoconical intake chamber, a feed valve interposed between the container tank and the combustion chamber to control a supply of the liquid component from the container tank to the combustion chamber, wherein the feed valve comprises: a tubular valve body defining the frustoconical intake chamber disposed on one end of the feed valve, a sliding cylinder defined by the tubular valve body and having a longitudinal axis, the sliding cylinder comprising a restricted portion, a widened portion and an annular end stop shoulder defined between the restricted portion and the widened portion, at least one inlet for the liquid component to move into the sliding cylinder, an outlet for the liquid component to move from the sliding cylinder into the combustion chamber, and a slide valve slidably engaged in the sliding cylinder, the slide valve comprising an annular end flange projecting radially outwards from an outer surface of the slide valve, the method comprising:

displacing the slide valve into a closed position to close the inlet and retain the slide valve in the closed position, via a spring, at least a portion of which is disposed within a portion of the slide valve, the spring acting axially on a first side of the slide valve, stopping the slide valve in the closed position by engaging the flange with the end stop shoulder;

supplying a pressurized fluid from a primer device mounted through a side wall of the combustion chamber and projecting within, the pressurized fluid acting axially on a second side of the slide valve, the second side being opposite to the first side;

moving the slide valve against the action of the spring from the closed position into a first open position, where the inlet is partially open for enabling the liquid component to enter the sliding cylinder and to act axially on the second side against the action of the spring; and moving the slide valve from the first open position into a second open position, where the inlet is completely open, wherein the spring is shaped so as to exert on the first side of the slide valve a thrust lower than a thrust exerted by the pressurized fluid on the second side of the slide valve.

12. The method according to claim 11, wherein moving the slide valve from the closed position to the first open position is triggered by at least one pyrogenic primer of the primer device to supply the pressurized fluid.

13. The method according to claim 11, wherein moving the slide valve from the closed position into the first open position is accomplished in a first time interval, and moving the slide valve from the first open position into the second open position is accomplished in a second time interval shorter than the first time interval.

14. The method according to claim 11, further comprising moving the slide valve, after the container tank is emptied, from the second open position to the closed position starting from a time in which pressure at the outlet is substantially equal to a first threshold value such as to exert on the second side of the slide valve the thrust lower than the thrust exerted on the first side of the slide valve by the spring.

15. The method according to claim 14, further comprising moving the slide valve from the second open position into a third open position, where the inlet is partially closed, when a total section of passage defined by the plurality of holes is substantially equal to a total section of passage defined by the inlet and the pressure at the outlet is substantially equal to a second threshold value lower than the first threshold value.

16. The method according to claim 15, further comprising moving the slide valve from the third open position into the closed position when the pressure at the outlet is lower than the second threshold value.

17. The method according to claim 15, wherein moving the slide valve from the second open position into the third open position is accomplished in a third time interval, and moving the slide valve from the third open position into the closed position is accomplished in a fourth time interval shorter than the third time interval.

18. The method according to claim 11, further comprising closing the exhaust nozzle with a closing member shaped so as to break when pressure in the combustion chamber is at least equal to a first pressure, wherein the combustion of the fuel with the comburent generates within the combustion chamber the first pressure, which is higher than a second pressure generated within the combustion chamber by the pressurized fluid.

19. A rocket engine comprising:
- a combustion chamber limited by a second side wall for combustion of two components, of which one is a fuel and the other is a comburent and of which at least one is in an initial liquid state, wherein the combustion of the fuel with the comburent generates within the combustion chamber a first pressure, which is higher than a second pressure generated within the combustion chamber by a pressurized fluid;
- an exhaust nozzle disposed at one end of the combustion chamber for discharging combustion products from the combustion chamber;
- an injection head disposed at another or at an opposite end of the combustion chamber, the injection head comprising an injection plate having a plurality of holes to enable fluid communication between the injection head and a frustoconical intake chamber;
- a member disposed in the combustion chamber for closing the exhaust nozzle and shaped to break when pressure in the combustion chamber is at least equal to the first pressure;
- a feed valve interposed between a container tank and the combustion chamber to control a supply of the liquid component from the container tank to the combustion chamber, wherein the feed valve comprises:
  - a tubular valve body defining the frustoconical intake chamber disposed on one end of the feed valve,
  - a sliding cylinder defined by the tubular valve body and having a longitudinal axis, the sliding cylinder comprising a restricted portion, a widened portion and an annular end stop shoulder defined between the restricted portion and the widened portion, and being laterally limited by a first side wall extending about the longitudinal axis, wherein the sliding cylinder is faced by the injection head,
  - at least one inlet made through the first side wall for the liquid component to move into the sliding cylinder,
  - an outlet substantially coaxial with the longitudinal axis for the liquid component to move from the sliding cylinder into the combustion chamber, wherein the outlet is faced by the injection plate,
  - a slide valve slidably engaged in the sliding cylinder, the slide valve comprising an annular end flange projecting radially outwards from an outer surface of the slide valve,
  - an elastic thrust spring, at least a portion of which is disposed within a portion of the slide valve, the elastic thrust spring acting axially on a first side of the slide valve to move and retain the slide valve into a closed position to close the inlet, wherein the slide valve is stopped in the closed position by engagement of the flange with the end stop shoulder, and
  - a gasket inserted between the slide valve and the sliding cylinder to separate in a fluid-tight manner the inlet from the outlet when the slide valve is arranged in the closed position; and
- a primer device comprising at least one pyrogenic primer mounted through the second side wall and projecting within the combustion chamber to supply the pressurized fluid acting axially on a second side of the slide valve, the second side being opposite to the first side, to move the slide valve against the action of the elastic thrust spring from the closed position into a first open position, where the inlet is partially open for enabling the liquid component to enter the sliding cylinder, to axially act on the second side against the action of the elastic thrust spring, and to move the slide valve from the first open position to a second open position, where the inlet is completely open;
- wherein the elastic thrust spring is shaped so as to exert on the first side of the slide valve a thrust lower than a thrust exerted by the pressurized fluid on the second side of the slide valve.

* * * * *